US006984695B2

(12) United States Patent
Brown et al.

(10) Patent No.: US 6,984,695 B2
(45) Date of Patent: Jan. 10, 2006

(54) HETEROGENEOUS/HOMOGENEOUS COPOLYMER

(75) Inventors: Stephen John Brown, Calgary (CA); Christopher John Brooke Dobbin, Calgary (CA); Clayton Trevor Elston, Kingston (CA); Norman Dorien Joseph Aubee, Okotoks (CA); Gilbert Alexander Arnould, Calgary (CA); Sarah Marshall, Calgary (CA); Lawrence Thomas Kale, Cochrane (CA); Mark Weber, Calgary (CA)

(73) Assignee: Nova Chemicals (International) S.A., (CH)

( * ) Notice: Subject to any disclaimer, the term of this patent is extended or adjusted under 35 U.S.C. 154(b) by 98 days.

(21) Appl. No.: 10/365,070

(22) Filed: Feb. 12, 2003

(65) Prior Publication Data

US 2004/0086671 A1  May 6, 2004

(30) Foreign Application Priority Data

Nov. 5, 2002  (CA)  .................................... 2411183

(51) Int. Cl.
*C08F 8/00* (2006.01)
*C08L 23/00* (2006.01)
*C08L 23/04* (2006.01)
*B32B 27/00* (2006.01)
*B32B 27/08* (2006.01)

(52) U.S. Cl. ...................... 525/191; 525/240; 428/500; 428/515

(58) Field of Classification Search ................. 525/191, 525/240; 428/500, 515
See application file for complete search history.

(56) References Cited

U.S. PATENT DOCUMENTS

| 3,645,992 | A |  | 2/1972 | Elston | |
|---|---|---|---|---|---|
| 4,542,199 | A |  | 9/1985 | Kaminsky et al. | 526/160 |
| 5,055,438 | A |  | 10/1991 | Canich | 502/117 |
| 5,064,802 | A |  | 11/1991 | Stevens et al. | 502/155 |
| 5,132,380 | A |  | 7/1992 | Stevens et al. | 526/126 |
| 5,198,401 | A |  | 3/1993 | Turner et al. | 502/155 |
| 5,324,800 | A |  | 6/1994 | Welborn, Jr. et al. | 526/160 |
| 5,382,630 | A |  | 1/1995 | Stehling et al. | 525/240 |
| 5,382,631 | A |  | 1/1995 | Stehling et al. | 525/240 |
| 5,530,065 | A |  | 6/1996 | Farley et al. | 525/240 |
| 5,589,555 | A |  | 12/1996 | Zboril et al. | 526/64 |
| 5,681,523 | A | * | 10/1997 | Cobler et al. | 264/565 |
| 5,714,547 | A | * | 2/1998 | Li et al. | 525/240 |
| 5,756,193 | A | * | 5/1998 | Yamamoto et al. | 428/220 |
| 5,844,045 | A |  | 12/1998 | Kolthammer et al. | 525/240 |
| 5,847,053 | A | * | 12/1998 | Chum et al. | 525/240 |
| 5,869,575 | A |  | 2/1999 | Kolthammer et al. | 525/240 |
| 6,063,879 | A |  | 5/2000 | Stephan et al. | 526/127 |
| 6,114,481 | A |  | 9/2000 | McMeeking et al. | 526/161 |
| 6,187,424 | B1 | * | 2/2001 | Kjellqvist et al. | 428/220 |
| 6,372,864 | B1 |  | 4/2002 | Brown | 526/65 |
| 6,414,088 | B1 | * | 7/2002 | Tanaka et al. | 525/191 |
| 6,426,384 | B1 | * | 7/2002 | Nishimura et al. | 525/191 |
| 6,713,562 | B2 | * | 3/2004 | Kagami et al. | 525/240 |

* cited by examiner

*Primary Examiner*—Nathan M. Nutter
(74) *Attorney, Agent, or Firm*—Kenneth H. Johnson

(57) ABSTRACT

Novel polyethylene copolymer compositions prepared with a homogeneous catalyst system are characterized by having a unique high molecular weight, low comonomer (high density) fraction. These heterogeneous/homogeneous compositions may be prepared using a solution polymerization process in which the polymerization reactor contains a gradient in temperature, catalyst concentration or monomer concentration. The heterogeneous/homogeneous compositions of this invention are easily processed into films having excellent tear strengths and low hexane extractables.

15 Claims, No Drawings

HETEROGENEOUS/HOMOGENEOUS COPOLYMER

FIELD OF THE INVENTION

This invention relates to polyethylene compositions having a unique balance of properties. Preferred polyethylene compositions may be easily "processed" to produce plastic films having very good tear strength, impact strength and optical properties.

BACKGROUND OF THE INVENTION

Linear low density polyethylene ("LLDPE") copolymers that are prepared by the copolymerization of ethylene with a higher alpha olefin using a conventional Ziegler-Natta type catalyst system are known to contain three different polymer fractions (or "modes"), namely 1) a low molecular weight fraction which contains a high comonomer content; 2) a copolymer fraction of intermediate molecular weight and intermediate comonomer content; and 3) a high molecular weight fraction which contains little or no comonomer. The low molecular weight fraction is sometimes also described as being "highly branched" (due to the high comonomer content) and/or "grease" (due to the low molecular weight). The high molecular weight content is also sometimes described as "homopolymer". The "grease" fraction often causes organoleptic problems and may even limit or restrict uses in which the polymer comes in contact with food. The "homopolymer" fraction generally imparts a stiffness to the resin and melts at a higher temperature than the other fractions. In general, the non-uniformity of the molecular weight and the comonomer content is a distinguishing characteristic of conventional Ziegler resins. It is now common to refer to these resins as "heterogeneous".

In contrast, "homogeneous" polyethylene copolymers are generally characterized by having a narrow molecular weight distribution and a narrow composition distribution. The term "homogeneous" was proposed by one of us to describe such polymers in U.S. Pat. No. 3,645,992 (Elston), the disclosure of which is incorporated herein by reference.

As noted in Elston '992, homogeneous polymers have a distinct melting point due to the uniform polymer architecture. The homogeneous polymers disclosed in the Elston '992 patent were prepared with a vanadium catalyst system which is insufficiently active to permit widespread commercial use.

Advances in catalyst technology now permit the production of homogeneous ethylene copolymers at commercially viable rates. For example, the metallocene/aluminoxane catalysts disclosed by Kaminsky (U.S. Pat. No. 4,542,199) and improved by Welborn (U.S. Pat. No. 5,324,800); the monocyclopentadienyl catalysts disclosed by Stevens et al. (U.S. Pat. No. 5,064,802) and Canich (U.S. Pat. No. 5,055,438); the ketimine catalysts disclosed by McMeeking et al. (U.S. Pat. No. 6,114,481); and the phosphinimine catalysts disclosed by Stephan et al (U.S. Pat. No. 6,063,879) are all highly active for the preparation of homogeneous copolymers.

A particularly important end use of LLDPE is the manufacture of films. Films prepared from homogeneous LLDPE generally have good optical properties, good organoleptic properties and excellent impact strength.

However, films prepared from homogeneous LLDPE generally have poor tear strength, particularly in the so-called "machine direction". In addition, homogeneous resins are difficult to "process" (i.e. to convert to films). This poor processability is manifested by high energy demands required to extrude the resin (e.g. large current draws on the electric motors used to drive the extrudes) and/or poor melt strength.

Attempts have been made to blend heterogeneous (Ziegler-Natta, or "Z/N") resins with homogeneous resins in order to produce a resin blend which is easier to convert to film and/or to produce film having higher impact strength and good tear properties. U.S. Pat. No. 5,530,065 (Farley, to Exxon) teaches that a trivial blend of a conventional heterogeneous Z/N resin and a metallocene resin has a balance of properties which are suitable for some film properties. Similarly, U.S. Pat. Nos. 5,844,045 and 5,869,575 (Kolthamer, to Dow) also disclose that simple blends of a conventional heterogeneous Z/N resin and homogeneous resin prepared with a monocyclopentadienyl catalyst are also suitable for preparing films.

However, it will also be appreciated that the simple blends of the above '065, '045 and '575 patents all contain the low molecular weight "grease" due to the use of the Z/N catalyst to prepare some of the blend composition. Moreover, the disclosures of the '065, '045 and '575 patents are silent with respect to the hexane extractables contents of the blends.

Thus, films prepared from conventional heterogeneous resins have comparatively poor impact strength, optical properties and organoleptic properties—but do have very good tear strength. Conversely, films prepared from homogeneous resins have excellent impact strength, optical properties and organoleptic properties—but poor tear strength. Previous attempts to utilize resin blends to eliminate this problem have not been completely successful. Simple blends of heterogeneous resins with homogeneous resins provide films with sub-optimal organoleptic properties (presumably because of the "grease" fraction in the conventional heterogeneous resin).

Another attempt to solve this problem is by preparing blends of more than one homogeneous resin is disclosed in U.S. Pat. Nos. 5,382,630 and 5,382,631 (Stehling et al., to Exxon). Stehling et al. '631 teach blends which are characterized by the substantial absence of blend components having a higher molecular weight and a lower comonomer content than other blend components (e.g. the high molecular weight homopolymer of conventional heterogeneous resins). These blends are shown to be useful for the preparation of structures having improved tear properties. However, the disclosure of this patent is silent on the subject of impact properties and we have observed that films made from such blends may suffer a very large loss of dart impact strength when the amount of lower molecular weight, higher density component is sufficient to enhance tear strength. One of us disclosed a dual reactor solution polymerization process to prepare a homogeneous copolymer composition which is useful for the preparation of films (Brown, U.S. Pat. No. 6,372,864). None of the inventive copolymer compositions disclosed in Brown '864 contained the high molecular weight, high density (very low comonomer) fraction which is an essential element of the compositions of this invention.

Thus, films prepared from conventional heterogeneous resins have comparatively poor impact strength, optical properties and organoleptic properties—but do have very good tear strength. Conversely, films prepared from homogeneous resins have excellent impact strength, optical properties and organoleptic properties—but poor tear strength. Previous attempts to utilize resin blends to eliminate this problem have not been completely successful. Simple blends of heterogeneous resins with homogeneous resins provide films with sub-optimal organoleptic properties and optical properties (presumably because of the "grease" fraction in the conventional heterogeneous resin).

SUMMARY OF THE INVENTION

We have now discovered a heterogenized/homogeneous polymer composition which may be used to prepare films having an improved balance of impact strength, tear strength and organoleptic properties.

In addition, the heterogenized/homogeneous polymer compositions of this invention are surprisingly easy to "process" in machinery used to convert the compositions into films (in comparison to homogeneous resins).

The heterogenized/homogeneous polymer compositions must be prepared using a "homogeneous catalyst"—i.e. a catalyst system that will produce homogeneous polymers (having a narrow molecular weight distribution and a narrow composition distribution) in a conventional polymerization reactor. In addition, the heterogenized/homogeneous polymer compositions of this invention must contain at least one first copolymer fraction and a second high molecular weight/ high density fraction. This second fraction is somewhat analogous to the "homopolymer" fraction of heterogeneous resins. In this sense, the compositions may be referred to as being "heterogenized". Thus, the polymer compositions of this invention are made with "homogenous" components prepared with a "homogeneous" catalyst system but they must also contain a high molecular weight, high density component which is analogous to a "heterogeneous" resin.

Thus, in one embodiment, the present invention provides a heterogenized/homogeneous polymer composition prepared with a homogeneous catalyst system, said composition comprising:

A) a first polymer fraction having a density of from 0.880 to 0.945 grams per cubic centimeter as measured by ASTM D792; a melt index, $I_2$, of from 0.1 to 200 grams per 10 minutes as determined by ASTM D1238; less then 2 weight % hexane extractables; and a substantial absence of homopolymer wherein said first polymer fraction comprises at least one homogeneous copolymer of ethylene and at least one $C_{4 to 10}$ alpha olefin, and wherein each of said at least one homogeneous copolymer is characterized by having a molecular weight distribution, Mw/Mn, of less then three; and B) a second polymer fraction having a higher molecular weight then said first fraction; a higher density then said first fraction; and a lower alpha olefin content then said first fraction, wherein said second polymer fraction comprises at least one second homogeneous polymer of ethylene, optionally with at least one $C_{4 to 10}$ alpha olefin comonomer, and wherein each of said at least one second homogeneous polymer of ethylene is characterized by having a molecular weight distribution, Mw/Mn, of less than 3.

As noted above, the second fraction must have both of a higher molecular weight and a lower comonomer content than the first fraction.

It will be appreciated by those skilled in the art that it is extremely difficult to prepare such a polymer composition by a simple mechanical blend of the two polymer fractions. Accordingly, it is highly preferred to prepare the present compositions by solution blending—especially via a solution polymerization process in which the fractions are blended in situ. It is particularly preferred to use two continuously stirred tank reactors (CSTR's) to prepare the compositions—although a single tube reactor (plug flow reactor) or a combination of a tube reactor and a CSTR may also be suitably employed.

The compositions of this invention may be used to prepare a wide variety of goods including injection molded parts, rotomolded parts and film. Preferred compositions which are described in more detail below are especially suitable for the preparation of films. The film may be prepared by conventional "cast" or "blown bubble" techniques. Monolayer films or multilayer films (prepared by coextrusion of multiple layers of laminates) are possible. The resulting films may be used to package foods and consumer goods in sealed packages, including sealed packages for liquids. The films are also suitable for preparing trash bags, "heavy duty packages" (for such goods as peat moss—and other gardening items including bark, fertilizer and decorative gravel—that are exposed to the outdoors in gardening centers); shrink films (which may be used in high performance packaging for poultry or cuts of meat); pallet wraps (to protect goods on pallets during shipping and/or outdoor storage); and stretch films.

The plastic parts and films prepared from the polymer compositions of this invention may include conventional additives such as antioxidants (e.g. hindered phenols and phosphates); UV stabilizers such as hindered amines; antiblocks (e.g. talc and silica); antistatic agents (e.g. low molecular weight polyethylene glycol); processing aids (e.g. fluoropolymers and polyethylene glycols having a molecular weight of from 2,000 to 8,000); pigments and the like.

DETAILED DESCRIPTION OF PREFERRED EMBODIMENTS

Part 1. Description of Catalysts

In general, any catalyst system which produces a "homogeneous" (as defined by Elston '922) ethylene copolymer may be used to prepare the composition of this invention. It is preferred to use a catalyst of a group 4 metal which provides an activity of at least 250,000 grams of polymer per gram of group 4 metal. Preferred catalysts contain at least one cyclopentadienyl ligand. Examples of such catalysts are disclosed in the aforesaid Welborn '800, Stevens '802, Stephan '879 and McMeeking '481 patents.

A preferred catalyst used in the process of this invention is an organometallic complex of a group 3, 4 or 5 metal which is characterized by having a cyclopentadienyl ligand (as defined in section 1.3 below) and a phosphinimine ligand (as defined in section 1.2.1 below) or a ketimide ligand (as defined in section 1.2.2 below).

Any such organometallic having a phosphinimine ligand which displays catalytic activity for ethylene polymerization may be employed. Preferred catalysts are defined by the formula:

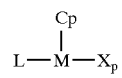

wherein M is a transition metal selected from Ti, Hf and Zr (as described in section 1.1 below); Cp is a cyclopentadienyl ligand (as broadly defined in section 1.3 below); L is a phosphinimine ligand or a ketimide ligand; X is an activatable ligand which is most preferably a simple monoanionic ligand such as alkyl or a halide (as described in section 1.4 below); and p is one or two depending upon the valence of M and X.

The most preferred catalysts are group 4 metal complexes in the highest oxidation state. For example, a preferred catalyst may be a cyclopentadienyl (phosphinimine) dichloride complex of titanium, zirconium or hafnium. It is especially preferred that the catalyst contain one phosphinimine ligand, one cyclopentadienyl ligand, and two "X" ligands (which are preferably both chloride).

1.1 Metals

The preferred catalyst is an organometallic complex of a group 3, 4 or 5 metal (where the numbers refer to columns in the Periodic Table of the Elements using IUPAC nomenclature). The preferred metals are from group 4, (e.g. titanium, hafnium or zirconium) with titanium being most preferred.

1.2.1 Phosphinimine Ligand

A preferred catalyst contains a phosphinimine ligand which is covalently bonded to the metal. This ligand is defined by the formula:

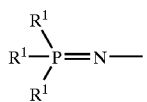

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

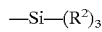

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

1.2.2 Ketimide Ligands

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b and c are illustrated below:

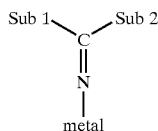

The substituents "Sub 1 and Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

1.3 Cyclopentadienyl Ligands

Preferred catalysts are group 4 organometallic complexes which contain one phosphinimine ligand or ketimide ligand and one cyclopentadienyl ligand.

As used herein, the term cyclopentadienyl ligand is meant to convey its broad meaning, namely a ligand having a five carbon ring which is bonded to the metal via eta-5 bonding. Thus, the term "cyclopentadienyl" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $—Si—(R)_3$ wherein each R is independently selected from the group consisting of hydrogen, a $C_{1-8}$ alkyl or alkoxy radical $C_{6-10}$ aryl or aryloxy radicals; germanyl radicals of the formula $Ge—(R)_3$ wherein R is as defined directly above.

1.4 Activatable Ligand X

The term "activatable ligand" refers to a ligand which may be activated by a cocatalyst, (also referred to as an "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. For example, a single divalent activatable ligand (such as butadiene) may be used with a group 4 metal in the 4+ oxidation state. The preferred catalyst metals are group 4 metals in their highest oxidation state (i.e. 4+) and the preferred activatable ligands are monoanionic (such as a halide—especially chloride or a alkyl—especially methyl). Thus, the preferred catalyst contain a phosphinimine ligand, a cyclopentadienyl ligand and two chloride (or methyl) ligands bonded to the group 4 metal. In some instances, the metal of the catalyst component may not be in the highest oxidation state. For example, a titanium (III) component would contain only one activatable ligand.

1.5 Summary Description of Preferred Catalyst

As previously noted, the most preferred catalyst is a group 4 organometallic complex in its highest oxidation state having a phosphinimine ligand, a cyclopentadienyl-type ligand and two activatable ligands. These requirements may be concisely described using the following formula for the preferred catalyst:

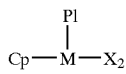

wherein (a) M is a metal selected from Ti, Hf and Zr; (b) Pl is a phosphinimine ligand defined by the formula:

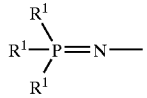

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; (c) Cp is a ligand selected from the group consisting of cyclopentadienyl, substituted cyclopentadienyl, indenyl, substituted indenyl, fluorenyl, substituted fluorenyl; and (d) each X is an activatable ligand.

2. Description of Cocatalyst

The catalyst components described in part 1 above are used in combination with at least one cocatalyst (or "activator") to form an active catalyst system for olefin polymerization. Preferred activators are described in more detail in sections 2.1 and 2.2 below.

2.1 Alumoxanes

The alumoxane may be of the formula:

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

Commercially available MAO typically contains free aluminum alkyl (e.g. trimethylaluminum or "TMA") which may reduce catalyst activity and/or broaden the molecular weight distribution of the polymer. If a narrow molecular weight distribution polymer is required, it is preferred to treat such commercially available MAO with an additive which is capable of reacting with the TMA. Alcohols are preferred (with hindered phenols being particularly preferred) for this purpose.

2.2 "Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably because the non-coordinating anion is sufficiently labile to be displaced by monomer which coordinates to the catalyst. Preferred ionic activators are boron-containing ionic activators described in (i)–(iii) below:

(i) compounds of the formula $[R^5]^+ [B(R^7)_4]^-$ wherein B is a boron atom, $R^5$ is a aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_t ZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron, N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include: N,N-dimethylaniliniumtetrakispentafluorophenyl borate, triphenylmethylium tetrakispentafluorophenyl borate, and trispentafluorophenyl borane.

3. Description of Dual Reactor Solution Polymerization Process

Solution processes for the (co)polymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methycyclohexane and hydrogenated naphtha. An example of a suitable solvent which is commercially available is "Isopar E" ($C_{8-12}$ aliphatic solvent, Exxon Chemical Co.).

The preferred solution polymerization process for this invention uses at least two polymerization reactors.

The polymerization temperature in the first reactor is from about 80° C. to about 180° C. (preferably from about 120° C. to 160° C.) and the second reactor is preferably operated at a higher temperature (up to about 220° C.). The most preferred reaction process is a "medium pressure process", meaning that the pressure in each reactor is preferably less than about 6,000 psi (about 42,000 kilopascals or kPa), most preferably from about 2,000 psi to 3,000 psi (about 14,000–22,000 kPa).

Suitable monomers for copolymerization with ethylene include $C_{4 to 10}$ alpha olefins. Preferred comonomers include alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene.

The heterogeneous/homogeneous copolymer compositions which may be prepared in accordance with the present invention are preferably LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc—the so-called very low and ultra low density polyethylenes.

Generally the alpha olefin may be present in an amount from about 3 to 30 weight %, preferably from about 4 to 25 weight %.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996).

The residence time in each reactor will depend on the design and the capacity of the reactor. Generally the reactors should be operated under conditions to achieve good mixing of the reactants. In addition, it is preferred that from 20 to 60 weight % of the final polymer is polymerized in the first reactor, with the balance being polymerized in the second reactor. On leaving the reactor system the solvent is removed and the resulting polymer is finished in a conventional manner.

In a highly preferred embodiment, the first polymerization reactor has a smaller volume than the second polymerization reactor. In addition, the first polymerization reactor is preferably operated at a colder temperature than the second reactor.

Preferred Polymer Compositions

Polyethylene resins are often converted to finished products by a melt extrusion process. Extrusion processes generally produce more "drawdown" of the polyethylene melt in the machine direction (MD) than the transverse direction (TD) due to the force which is required to "draw" the melt through the extrusion die. This typically produces a finished plastic part with unbalanced mechanical properties which vary with the orientation or direction of measurement. A common example of this phenomenon is illustrated by considering an injection molded plastic cup. These cups are usually fabricated by forcing the plastic melt through an injection port at the base of the cup mold thus producing a flow from the base of the cup to the lip of the cup in a lengthwise direction. The finished plastic cup therefore has a "machine direction" along the length of the cup and is more prone to split or tear in this lengthwise direction (i.e. the cup is less prone to fail around the circumference or "transverse direction").

An analogous phenomenon is observed with polyethylene films. That is, extruded plastic films generally have poor "machine direction" tear strength in comparison to transverse direction tear strength. This may be referred to as a tear strength imbalance. It has been observed that this effect (i.e. MD vs. TD tear imbalance) becomes more pronounced in films prepared from heterogeneous ethylene-butene copolymers as the molecular weight of the copolymer increases. That is, the relative MD vs. TD imbalance becomes more pronounced in films prepared from higher molecular weight heterogeneous copolymers. While not wishing to be bound by theory, it is postulated that this phenomenon is a result of the greater stress which is required to extrude the higher molecular weight copolymer (which in turn gives rise to a higher orientation of the polymer molecules and thereby causes a higher MD/TD imbalance).

This phenomenon has also been observed to become even more pronounced with homogeneous resins. While again not wishing to be bound by theory, it is believed that the uniform structure of a homogeneous resin causes the polymer molecules to be very uniformly oriented during melt extrusion. In any event, the MD tear of films prepared from homogeneous polymers is generally very poor. However, the impact strength of films prepared from homogeneous polymers is usually excellent.

As previously noted, it is known to prepare homogeneous ethylene polymer compositions in which a fraction or blend component of the composition contains a higher density but lower molecular weight than the other polymer fraction (e.g. the Stehling et al. '631 patent and the commercially available EXCEED™ 1018 resin).

In contrast, the compositions of this invention must contain a "second" polymer fraction which is both higher molecular weight and higher density (or alternatively stated, "less branched") than the first copolymer fraction. It is preferred that this high molecular weight/high density fraction be present in an amount of from 1 to 20 weight %, especially from 2 to 10 weight %, of the total polymer composition. It is also preferred that the high molecular weight/high density fraction has less than 5, especially less than 4, short branches per 1,000 carbon atoms. It is further preferred that the high molecular weight/high density fraction has a weight average molecular weight, Mw, of from 130,000 to 500,000, especially more than 150,000 to 500,000.

The "first" fraction of the polymer compositions of this invention contains at least one homogeneous copolymer. The first fraction may contain more than one homogenous copolymer but this is not necessary.

The heterogenized/homogenous compositions of this invention are especially suitable for the preparation of films. It is preferred that films prepared from a heterogenized/homogenous composition have an overall density of from 0.900 to 0.940 g/cc (especially from 0.905 to 0.920) and an overall melt index, $I_2$, of from 0.3 to 20.

EXAMPLES

Part 1. Comparative Examples

Comparative Example 1

A sample of commercially available resin sold under the trademark EXCEED™ 1018CA by ExxonMobil Chemical was subjected to a gel permeation chromatography (GPC) analysis to determine molecular weight distribution and a temperature rising elation fractionation (TREF) analysis. Trichlorobenzene was used as the mobile liquid phase for the TREF analysis. The GPC analysis is described in Part 2 below.

The EXCEED™ 1018CA resin is reported to be an ethylene-hexene copolymer produced using ExxonMobil Chemicals' EXXPOL™ technology (which is believed to be a metallocene catalyst technology).

The TREF analysis of this resin showed two distinct elution peaks. The first peak—indicative of a homogeneous copolymer fraction—was observed at 80.7° C. A second fraction having less comonomer (high density fraction) was observed to elute at 93.1° C.

GPC analysis of the whole resin showed the weight average molecular weight (Mw) to be about 101,000 and the molecular weight distribution to be about 2.1.

A sample of this resin was then fractionated into several "cuts" according to elution temperature (using a conventional TREF preparation technique with trichlorobenzene as the mobile liquid phase solvent). The high density fraction (or cut), which eluted at a temperature of from 90 to 95° C., was observed to be about 8.5 weight % of the total polymer composition. This fraction was analyzed to have a weight average molecular weight of 72,000. Thus, this sample of EXCEED™ 1018CA is consistent with the disclosure of the aforesaid Stehling et al. '630 patent because the "high density" fraction has a lower molecular weight than the copolymer fraction (i.e. 72,000 vs. 101,000). One mil films prepared from EXCEED™ 1018CA (on a blown film line having a 60 mil die gap, using a 2.5:1 blow up ratio) are reported by ExxonMobil Chemical to have (typical) dart impact strength of 740 grams, machine direction (MD) tear strength of 260 grams, and transverse direction (TD) tear strength of 340 grams.

Comparative Example 2

An ethylene-octene copolymer having a density of 0.917 grams per cubic centimeter (g/cc) and a molecular weight distribution (Mw/Mn) of 1.8 was prepared in a solution polymerization process using a titanium catalyst having one cyclopentadienyl ligand, one tri(tertiary butyl) phosphinimine ligand and two chloride ligands (referred to hereinafter as "CpTiNP(t-Bu)$_3$Cl$_2$") and an activator consisting of a commercially available methylaluminoxane ("MAO") at an Al/Ti mole ratio of 100/1 and triphenylmethylium tetrakispentafluorophenyl borate ("Ph$_3$CB(C$_6$F$_5$)$_4$") at a B/Ti mole ratio of 1.2/1.

The resulting copolymer did not contain a very high density/higher melting point fraction in any meaningful amount.

A blown film having an average thickness of 1 mil was prepared using a conventional extruder at a blow up ratio of 2.5/1 through a 35 mil die gap.

The resulting film had a dart impact of greater than 1,000 grams, a machine direction tear strength of 250 grams and a transverse direction tear strength of 340 grams.

Part 2. Inventive Polymerizations

The examples illustrate the continuous solution copolymerization of ethylene and octene at medium pressure. The inventive examples used a first continuously stirred tank reactor ("CSTR") which operated at a relatively low temperature (see Table B.1). The first reactor pressure was about 14.5 Mega Pascals, and the second reactor pressure was marginally lower (to facilitate flow from the first to second reactor). The contents from this reactor flowed into a larger, second polymerization reactor which was also a CSTR. The volume of reactor 2 was 1.8 times larger than the volume of reactor 1.

The process was continuous in all feed streams (i.e. solvent, which was methyl pentane; monomers and catalyst systems) and in the removal of product monomer were purified prior to addition to the reactor using conventional feed preparation systems (such as contact with various absorption media to remove impurities such as water, oxygen and polar contaminants).

Feeds (monomers, catalysts, activators) were pumped to the reactors as shown in Table B.1. Average residence times for the reactors were calculated by dividing average flow rates by reactor volume. The residence time in each reactor for all of the inventive experiments was less than 1.5 minutes and the reactors were well mixed. While not wishing to be bound by theory, it is believed that the short residence time of the inventive polymerization leads to small temperature, catalyst and/or monomer concentration gradients which cause the formation of the high molecular weight/high density polymer component which is essential to the compositions of this invention.

The catalyst used in all experiments was a titanium (IV) complex having one cyclopentadienyl ligand, two chloride ligands and one tri (tertiary butyl) phosphinimine ligand ("CpTiNP($^t$Bu)$_3$Cl$_2$"). The cocatalysts were a commercially available methylalumoxane ("MAO") and a commercially available borate ("Ph$_3$CB(C$_6$F$_5$)$_4$"). A hindered phenol (2,6 di-tertiary butyl, 4-ethyl, phenol) was also used as shown in Table B.1.

The amount of catalyst added to each reactor (expressed as parts per million (ppm) by weight, based on the total mass of the reactor contents) as shown in Table B.1. The MAO, borate and phenol were added in the amounts shown in Table B.1. The amount of MAO (expressed as moles of Al per mole of Ti (in the catalyst)), borate (expressed as moles of B per mol of Ti) and moles of phenol (expressed as moles of OH per mole of Al in the MAO) is shown in Table B.1 where "R1" refers to reactor 1 and "R2" refers to reactor 2.

The ethylene concentration in reactor 1 ("R1") is expressed as weight %. An equivalent flow of ethylene was provided to each reactor.

The total amount of octene used in both reactors is reported in Table B.1 based on the total amount of ethylene (mole/mole basis). The fraction of the octene added to R1 is shown in Table B.1 (with the remaining octene being added to the second reactor "R2").

Hydrogen was added to the reactors in small amounts as shown in Table B.1 (expressed as ppm by weight).

(For clarification: Table B.1 shows that the first composition, was prepared using the following average conditions in reactor 1 ("R1"): catalyst concentration of 0.099 ppm; boron/Ti=1.1 (mol/mol); Al/Ti=65.4 (mol/mol); OH/Al=0.3 (mol/mol); ethylene concentration=9.2 weight %; 80% of the total octene added to R1 and R2 was added to R1; the total octene/ethylene mole ratio was 0.85; the hydrogen concentration was 0.23 ppm by weight in R1; the mean R1 reactor temperature was 139.8° C. and the residence time was 1.0 minutes).

The composition of the monomer feeds and the position of the monomer feed port(s) relative to the catalyst feed port in the second reactor "R2" was varied to examine the effect of these variables upon the microstructure of the heterogenized homogeneous compositions of this invention.

The feed ports to reactor 1 were not adjusted for any of the experiments. One feed port was used to add ethylene and octene in solvent and another feed port was used for all of the catalyst components added to R1.

The entry port into reactor R2 for the polymer solution from R1 was not changed for any of the experiments shown in Table B.1—it was located on one side of the reactor, about midpoint between the top and bottom. The first product (entry 1 in Table B.1) was prepared by feeding the fresh monomer and catalyst at the bottom of the reactor R2 through separate feed lines.

Product 2 was prepared by moving the fresh monomer feed to the side of reactor.

Product 3 to 6 were prepared using "split fresh monomer feed"—i.e. through two nozzles on the side of the reactor. Cocatalyst flows and hydrogen flows were also changed for Products 3 to 6 as shown in Table B.1.

Polymer properties were measured using test methods described below:

Melt index ("MI") measurements are conducted according to ASTM method D-1238.

Polymer densities are measured using ASTM D-1928.

Molecular weights were analyzed by gel permeation chromatography (GPC), using an instrument sold under the tradename "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw").

Film properties were measured using the following test methods:

| | |
|---|---|
| Haze | (ASTM D-1003); |
| Gloss | (ASTM D-2457); |
| MD Tear and TD Tear Resistance | (ASTM D-1922); |
| Dart Impact Strength | (ASTM D-1709); and |
| Hexane Extractables | (Complies with U.S. Food and Drug Administration (FDA) test set out in the Code of Federal Regulations Title 21, Parts 177.1520. In general, a film sample is extracted in hexane at 50° C. for 2 hours.) |

Melt index, $I_2$, and density data for each of the heterogenized homogeneous compositions are also given in Table B.1.

TREF and GPC analysis of Products 1, 4 and 6 was then completed. Product 1 was expected to be most "heterogenized" (due to the previously discussed locations of the fresh monomer feed and catalyst ports).

Product 1 had an Mw of 93,300; an Mn of 24,000; and an average of 15 short chain branches per 1,000 carbon atoms. 91.5 weight % of the composition eluted at the lower temperatures expected for homogeneous copolymers. However, 8.5 weight % of Product 1 eluted over a higher temperature range of from 88 to 110° C. This fraction had an Mw of 130,400 and only 3.9 branches per 1,000 carbon atoms—thus, it was higher molecular weight and lower comonomer content (higher density) than the remainder of the composition. These data are shown in Table B.2, together with analogous data for Products 4 and 6 (from the polymerization examples). In Table B.2, "SCB" refers to the number of short chain branches per 1,000 carbon atoms. A low SCB figure indicates a low amount of comonomer.

The term "heterogenized fraction" in Table B.2 refers to the high molecular weight, high density component which elutes at a temperature of from 88 to 110° C. (using the TREF technique), expressed as a weight % of the total heterogeneous/homogeneous composition. For clarity, the data in Table B.2 show that Product 1 contained 8.5 weight % of the high density/high molecular weight, low comonomer content material and Product 6 contained 5.9 weight %.

Part 3. Film Preparation

Films were prepared from compositions 1 to 6 which were prepared in the polymerizations observed above. A comparative film was also made using the previously described commercially available EXCEED™ 1018 product. The films were manufactured on a conventional blown film line which was fed by a single screw extruder having a 2.5 inch screw diameter. The extruder was driven by an electrical motor. Conventional additives (antioxidants and process aid) were added to all extrusions. The extrudate was forced through a circular die having a four inch diameter and a 35 mil die gap. A blow up ratio (BUR) of 2.5:1 was used to prepare the film. Other processing conditions (output, head pressure and motor load) are shown in Table C.1. Referring to Table C.1, it can be seen that the electrical power demand required to drive the extruder is expressed as a current load on the motor (expressed in amps) to produce a given film output (expressed in pounds of film per hour). The electrical demand for the product from experiment 1-C was 54 amps for a 100 lbs/hr throughput (in comparison to 36–39 amps for the inventive composition). Thus, the comparative LLDPE of experiment 1-C has poor "processability" (as indicated by load on the electrical motor).

Physical properties of the films are shown in Table C.1. The "hexane extractables" content of all films is very low. This is a very desirable feature of films made from a homogeneous catalyst system.

The comparative film 1-C had a very high dart impact strength but poor tear properties. [Note that the "dart" impact strength of 1,226 g is significantly higher than the "typical" value of 740 reported by the resin manufacturer—as discussed in Part 1 above. However, the MD and TD tear strength numbers shown in Table C.1 (255 g and 337 g) correspond very closely to the "typical" values (MD=260 g, TD=340 g) reported by the manufacturer of the EXCEED™ 1018 resin.] All of the inventive compositions 2 to 6 have significantly improved tear strengths. Moreover, the films made from heterogeneous/homogeneous resins 4 to 6 also exhibit very good impact strength.

It will also be noted that the "haze" values of all of the films prepared on this machine were not very impressive. Additional experimentation showed that the haze values could be greatly improved by blending some high pressure low density ("LD") resin or conventional (heterogeneous) linear low density resin with the inventive resins. Blends of up to 40 weight % of the LD or heterogeneous LLDPE resins may be used to improve haze results and amounts as low as 0.25 to 3.00 weight % were observed to reduce haze levels to less than 10%.

For example, three blends of a high pressure, low density polyethylene "LD" (having a density of 0.921 g/cc and a melt index, $I_2$, of 0.8 g/10 minutes) with Product 4 were blown into film and tested for haze. The three blends contained 2 weight %, 3 weight % and 4 weight % (respectively) of the LD with the balance to 100 weight % being Product 4. These films had haze values of 5%, 6% and 5%, respectively. Three further "blended" films were then prepared on a larger blown film machine (having a screw extruder diameter of 3.5 inches) and tested for haze. These blends were made with Product 5 and contained only 1 weight %, 0.75 weight % and 0.5 weight % of the above described LD. The haze values for these films were 3%, 4% and 4%, respectively.

Additional films were prepared at different film gauges (from 0.5 to 2.5 mils) using different blow up ratios (from 2 to 3). These data are not included, but the tear strengths of all films were observed to be excellent.

TABLE B.2

| | Overall Composition | | | Heterogenized Fraction | | | |
| --- | --- | --- | --- | --- | --- | --- | --- |
| Product | Mn ($\times 10^{-3}$) | Mw ($\times 10^{-3}$) | SCB (per 1000 C atoms) | Weight % | Mn ($\times 10^{-3}$) | Mw ($\times 10^{-3}$) | SCB (per 1000 C atoms) |
| 1 | 24.1 | 93.3 | 15.0 | 8.5 | 76.9 | 130.4 | 3.9 |
| 4 | 27.8 | 91.7 | 15.1 | 5.3 | 99.3 | 185.1 | 3.1 |
| 6 | 28.7 | 91.6 | 14.9 | 5.9 | 87.4 | 165.2 | 2.8 |

TABLE B.1

| RESIN | 1 | 2 | 3 | 4 | 5 | 6 |
| --- | --- | --- | --- | --- | --- | --- |
| Catalyst (ppm) to R1 | 0.099 | 0.090 | 0.093 | 0.094 | 0.095 | 0.100 |
| R1 B/Ti ratio (mol/mol) | 1.1 | 1.1 | 1.1 | 1.1 | 1.1 | 1.1 |
| R1 Al/Ti ratio (mol/mol) | 65.4 | 65.3 | 65.1 | 65.3 | 200.5 | 65.1 |
| R1 OH/Al ratio (mol/mol) | 0.30 | 0.30 | 0.30 | 0.30 | 0.30 | 0.30 |
| Catalyst (ppm) to R2 | 0.45 | 0.40 | 0.36 | 0.32 | 0.32 | 0.32 |
| R2 B/Ti ratio (mol/mol) | 1.2 | 1.2 | 1.2 | 1.2 | 1.2 | 1.2 |
| R2 Al/Ti ratio (mol/mol) | 45.0 | 45.0 | 45.0 | 45.0 | 0.2 | 45.0 |
| R2 OH/Al ratio (mol/mol) | 0.30 | 0.30 | 0.30 | 0.30 | 0.02 | 0.30 |
| Ethylene conc R1 (weight %) | 9.2 | 9.4 | 9.4 | 9.5 | 9.3 | 9.4 |
| Octene % to R1 | 80.0 | 80.0 | 59.9 | 80.0 | 80.0 | 97.5 |
| Total Octene/Ethylene | 0.85 | 0.90 | 0.98 | 0.90 | 0.90 | 0.87 |
| R1 H2 (ppm) | 0.23 | 0.27 | 0.26 | 0.25 | 0.24 | 0.26 |
| R2 H2 (ppm) | 0.85 | 0.52 | 0.45 | 0.50 | 0.48 | 0.37 |
| R1 mean temperature (° C.) | 139.8 | 140.1 | 140.0 | 141.4 | 139.8 | 140.2 |

TABLE B.1-continued

| RESIN | 1 | 2 | 3 | 4 | 5 | 6 |
|---|---|---|---|---|---|---|
| R1 outlet (° C.) | 140.5 | 140.7 | 140.6 | 141.9 | 140.4 | 140.8 |
| R1 ethylene conversion (%) | 85.7 | 84.5 | 84.8 | 85.1 | 85.4 | 84.8 |
| R2 mean temperature (° C.) | 190.9 | 189.2 | 189.7 | 188.6 | 187.5 | 188.6 |
| R2 outlet (° C.) | 193.3 | 191.7 | 192.8 | 191.4 | 190.4 | 191.7 |
| R2 ethylene conversion (%) | 92.1 | 90.5 | 88.5 | 89.2 | 88.3 | 90.0 |
| R1 residence time (min) | 1.0 | 1.1 | 1.0 | 1.0 | 1.0 | 1.0 |
| R2 residence time (min) | 1.2 | 1.2 | 1.1 | 1.1 | 1.1 | 1.1 |
| Melt Index $I_2$ (g/10 minutes) | 1.2 | 1.1 | 0.9 | 1.1 | 1.1 | 1.2 |
| Density (g/cc) | 0.917 | 0.918 | 0.918 | 0.918 | 0.917 | 0.917 |

TABLE C.1

| | 1 mil Films 2.5/1 BUR | | | | | |
|---|---|---|---|---|---|---|
| | 1-C | 2 | 3 | 4 | 5 | 6 |
| Dart Impact Strength (g) | 1336 | 367 | 648 | 1004 | 1282 | 1335 |
| Hexane Extractables (%) | 0.4 | 0.9 | 0.9 | 0.6 | 0.5 | 0.6 |
| MD Tear (g) | 255 | 476 | 347 | 345 | 343 | 347 |
| TD Tear (g) | 337 | 824 | 548 | 509 | 478 | 463 |
| Haze (%) | 20 | 30 | 27 | 22 | 32 | 32 |
| Output (lbs/hr) | 100 | 100 | 100 | 100 | 100 | 100 |
| Screw Speed (rpm) | 37 | 40 | 40 | 40 | 39 | 38 |
| Amps | 54 | 38 | 38 | 38 | 39 | 36 |
| Average Pressure (psi) | 4865 | 3780 | 3945 | 3880 | 3945 | 3700 |

Note: Comparative film 1-C was prepared from EXCEED ™ 1018 resin.

What is claimed is:

1. A heterogenized/homogeneous polymer composition comprising:
   A) from 90 to 98 eight % of a first polymer fraction having a density of from 0.880 to 0.945 grams per cubic centimeter as measured by ASTM D792; a melt index, $I_2$, of from 0.1 to 200 grams per 10 minutes as determined by ASTM D1238; less then 2 weight % hexane extractables; and a substantial absence of homopolymer wherein said first polymer fraction comprises at least one homogeneous copolymer of ethylene and at least one $C_{4\ to\ 10}$ alpha olefin, and wherein each of said at least one homogeneous copolymer is characterized by having a molecular weight distribution, Mw/Mn, of less then three; and
   B) from 2 to 10 weight % of a second polymer fraction having a higher molecular weight, Mw, than that of said first fraction; a higher density than said first fraction; and a lower alpha olefin content than said first fraction, wherein said second polymer fraction comprises at least one second homogeneous polymer of ethylene, optionally with at least one $C_{4\ to\ 10}$ alpha olefin comonomer, and wherein each of said at least one second homogeneous polymer of ethylene is characterized by having a molecular weight distribution, Mw/Mn, of less than 3, and by having less than 4 short chain branches per 1,000 carbon atoms.

2. The polymer composition of claim 1 when prepared in a solution polymerization process using a catalyst system comprising an organometallic complex of a group 4 metal having an activity greater than 250,000 grams of polymer composition per gram of said group 4 metal.

3. The polymer composition of claim 1 containing less than 2 weight % hexane extractables.

4. The polymer composition of claim 1 having an overall composition density of from 0.910 to 0.940 grams per cubic centimeter as determined by ASTM D792.

5. The polymer composition of claim 1 wherein said first polymer fraction comprises at least one homogeneous copolymer of ethylene and octene-1.

6. Film prepared from the polymer composition of claim 1.

7. Film prepared from a blend of the polymer composition of claim 1 and at least one additional polyethylene selected from the group consisting of high pressure linear low density polyethylene; heterogeneous linear low density polyethylene; heterogeneous high density polyethylene; and homogeneous linear low density polyethylene.

8. Film according to claim 7 having a thickness of from 0.5 mil to 3.0 mil; a machine direction tear strength as determined by ASTM D1922 of greater than 300 grams per mil; and a hexane extractables content of less than 2 weight %.

9. A multilayer film structure comprising at least one layer of film according to claim 6.

10. A multilayer film structure comprising at least one layer of film according to claim 7.

11. A sealed package manufactured from a film according to claim 6.

12. A trash bag manufactured from a film according to claim 6.

13. A liquid package manufactured from a film according to claim 6.

14. A heavy-duty package manufactured from a film according to claim 6.

15. A pallet wrap package manufactured from a film according to claim 6.

* * * * *